United States Patent
Hui et al.

(10) Patent No.: US 11,368,894 B2
(45) Date of Patent: Jun. 21, 2022

(54) METHOD AND DEVICE FOR TRIGGERING BEAM FAILURE RECOVERY PROCEDURE OF MULTIBEAM SYSTEM

(71) Applicant: ELECTRONICS AND TELECOMMUNICATIONS RESEARCH INSTITUTE, Daejeon (KR)

(72) Inventors: Bing Hui, Daejeon (KR); Il Gyu Kim, Chungcheongbuk-do (KR); Junhyeong Kim, Daejeon (KR); Gosan Noh, Daejeon (KR); Hee Sang Chung, Daejeon (KR); Sung Woo Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/633,527

(22) PCT Filed: Jul. 24, 2018

(86) PCT No.: PCT/KR2018/008375
§ 371 (c)(1),
(2) Date: Jan. 23, 2020

(87) PCT Pub. No.: WO2019/022483
PCT Pub. Date: Jan. 31, 2019

(65) Prior Publication Data
US 2020/0196216 A1 Jun. 18, 2020

(30) Foreign Application Priority Data

Jul. 24, 2017 (KR) .................. 10-2017-0093462
Jul. 24, 2018 (KR) .................. 10-2018-0086199

(51) Int. Cl.
*H04B 7/06* (2006.01)
*H04W 74/08* (2009.01)
(Continued)

(52) U.S. Cl.
CPC ......... *H04W 36/305* (2018.08); *H04W 36/06* (2013.01); *H04W 36/36* (2013.01)

(58) Field of Classification Search
None
See application file for complete search history.

(56) References Cited

U.S. PATENT DOCUMENTS

2014/0295842 A1 10/2014 Choi et al.
2017/0339575 A1 11/2017 Kim et al.
(Continued)

OTHER PUBLICATIONS

"RAN1 Chairman's Notes", 3GPP TSG RAN WG1 Meeting #89, Hangzhou, P.R. China, May 15-19, 2017.
(Continued)

*Primary Examiner* — Gary Lafontant
(74) *Attorney, Agent, or Firm* — Rabin & Berdo, P.C.

(57) ABSTRACT

Provided are a method and a device for triggering a beam failure recovery (BFR) procedure of a multibeam system by means of the steps of: detecting a beam failure by monitoring a wireless link connected with a base station; identifying a candidate transmission beam of the base station; and transmitting a BFR request to the base station when the candidate transmission beam of the base station is identified.

14 Claims, 5 Drawing Sheets

(51) Int. Cl.
    *H04W 36/30*     (2009.01)
    *H04W 36/36*     (2009.01)
    *H04W 36/06*     (2009.01)

(56) References Cited

U.S. PATENT DOCUMENTS

2018/0006770 A1    1/2018   Guo et al.
2020/0099437 A1*   3/2020   Harada ................ H04B 17/318

OTHER PUBLICATIONS

Catt, "Considerations on DL Beam Failure and Recovery", R1-1710058, 3GPP TSG RAN WG1 NR Ad-Hoc#2, Qingdao, P.R. China, Jun. 17, 2017.
Huawei et al., "General Views on Beam Failure Recovery", R1-1709929, 3GPP TSG RAN WG1 NR Ad Hoc Meeting, Qingdao, China, Jun. 17, 2017.
LG Electronics, "Discussion on Beam Failure Recovery", R1-1710283, 3GPP TSG RAN WG1 NR Ad-Hoc#2, Qingdao, P.R. China, Jun. 17, 2017.
NTT DOCOMO, Inc., "Discussion on NR RLM and RLF", R1-1708446, 3GPP TSG RAN WG1 Meeting #89, Hangzhou, P.R. China, May 6, 2017.
Qualcomm, "LS on NR Beam Management", R1-1712007, 3GPP TSG-RAN1 NR Ad-Hoc#2, Qingdao, China, Jun. 27-30, 2017.
Zte, "4-step Random Access Procedure", R1-1707049, 3GPP TSG RAN WG1 #89 Meeting Hangzhou, P.R. China, May 6, 2017.

* cited by examiner

METHOD AND DEVICE FOR TRIGGERING BEAM FAILURE RECOVERY PROCEDURE OF MULTIBEAM SYSTEM

TECHNICAL FIELD

The present disclosure relates to a method and a terminal for triggering a BFR procedure in a multibeam system.

BACKGROUND ART

The work item (WI) of the 3GPP NR (New Radio) is designed to provide an NR system that meets the 5G requirements. In the 3GPP NR, multibeam operation based on hybrid beamforming is adopted to improve system performance. In order to enable multibeam operation, the physical random access channel (PRACH) and the message of the RA procedure need to be thoughtfully designed.

DISCLOSURE

Technical Problem

An exemplary embodiment provides a method for triggering a BFR procedure by a terminal in a multibeam system.

Another exemplary embodiment provides a terminal triggering a BFR procedure in a multibeam system.

Technical Solution

According to an exemplary embodiment, a method for triggering a beam failure recovery (BFR) procedure by a terminal in a multibeam system is provided. The method includes: monitoring a radio link with a base station to detect beam failure; identifying a candidate transmission beam at the base station; and transmitting a BFR request to the base station when the candidate transmission beam is identified.

The monitoring a radio link with a base station to detect beam failure may include: comparing strength of a received power of a reference signal from the base station with a predetermined threshold; and determining that the beam failure has occurred when the strength of the received power of the reference signal is lower than the predetermined threshold for a predetermined time duration.

The reference signal may include a channel state information-reference signal (CSI-RS) or at least one reference signal in a synchronization signal block (SSB) including a synchronization signal and a demodulation reference signal of a physical broadcast channel.

The identifying a candidate transmission beam of the base station may include identifying the candidate transmission beam based on a reference signal received power (RSRP) of a channel state information-reference signal (CSI-RS) received from the base station, and the transmitting a BFR request to the base station when the candidate transmission beam is identified may include transmitting the BFR request to the base station through a physical random access channel (PRACH) associated with the CSI-RS when the candidate transmission beam is identified based on the RSRP of the CSI-RS.

The method may further include: identifying the candidate transmission beam based on an RSRP of a reference signal in a synchronization signal block (SSB) received from the base station when the candidate transmission beam at the base station is not identified by the RSRP of the CSI-RS; and transmitting a BFR request to the base station when the candidate transmission beam is identified based on the RSRP of the reference signal in the SSB.

The transmitting a BFR request to the base station when the candidate transmission beam is identified based on the RSRP of the reference signal in the SSB may include transmitting the BFR request through a physical random access channel associated with an SSB with which the candidate transmission beam is identified.

The method may further include triggering a radio link failure (RLF) procedure for the radio link with the base station after a timer set to measure an out of synchronization (OOS) of the RLF expires when the candidate transmission beam at the base station is not identified based on the RSRP of the CSI-RS and the RSRP of the reference signal in the SSB.

The BFR request may include an ID of the terminal and information about the candidate transmission beam.

The ID of the terminal may correspond to an index of a sequence which is used to generate the BFR request.

The information about the candidate transmission beam may include information for indicating whether the candidate transmission beam exists or not.

According to another exemplary embodiment, a terminal for triggering a beam failure recovery (BFR) procedure in a multibeam system is provided. The terminal includes: a processor, a memory and a radio frequency (RF) unit, wherein the processor executes a program included in the memory to perform: monitoring a radio link with a base station to detect beam failure; Identifying a candidate transmission beam at the base station; and transmitting a BFR request to the base station when the candidate transmission beam is identified.

When the processor performs the monitoring a radio link with a base station to detect beam failure, the processor may execute the program to perform: comparing a strength of a received power of a reference signal from the base station with a predetermined threshold; and determining that the beam failure has occurred when the strength of the received power of the reference signal is lower than the predetermined threshold for a predetermined time duration.

The reference signal may include a channel state information-reference signal (CSI-RS) or at least one reference signal in a synchronization signal block (SSB) including a synchronization signal and a demodulation reference signal of a physical broadcast channel.

When the processor performs the identifying a candidate transmission beam of the base station, the processor may execute the program to perform identifying the candidate transmission beam based on a reference signal received power (RSRP) of a channel state information-reference signal (CSI-RS) received from the base station, and when the processor performs the transmitting a BFR request to the base station, the processor may execute the program to perform transmitting the BFR request to the base station through a physical random access channel (PRACH) associated with the CSI-RS when the candidate transmission beam is identified based on the RSRP of the CSI-RS.

The processor may execute the program to further perform: identifying the candidate transmission beam based on an RSRP of a reference signal in a synchronization signal block (SSB) received from the base station when the candidate transmission beam at the base station is not identified by the RSRP of the CSI-RS; and transmitting a BFR request to the base station when the candidate transmission beam is identified based on the RSRP of the reference signal in the SSB.

When the processor performs the transmitting a BFR request to the base station when the candidate transmission beam is identified based on the RSRP of the reference signal in the SSB, the processor may execute the program to perform transmitting the BFR request through a physical random access channel associated with an SSB with which the candidate transmission beam is identified.

The processor may execute the program to further perform triggering a radio link failure (RLF) procedure for the radio link with the base station after a timer set to measure an out of synchronization (OOS) of the RLF expires when the candidate transmission beam at the base station is not identified based on the RSRP of the CSI-RS and the RSRP of the reference signal in the SSB.

The BFR request may include an ID of the terminal and information about the candidate transmission beam.

The ID of the terminal may correspond to an index of a sequence which is used to generate the BFR request.

The information about the candidate transmission beam may include information for indicating whether the candidate transmission beam exists or not.

Advantageous Effects

A triggering method for the BFR procedure suitable for a multibeam system of 3GPP NR is provided. Further, a method for triggering the BFR procedure suitable for a future $5^{th}$ generation communication system including a high speed train (HST) scenario is provided.

MODE FOR INVENTION

Figure 1:
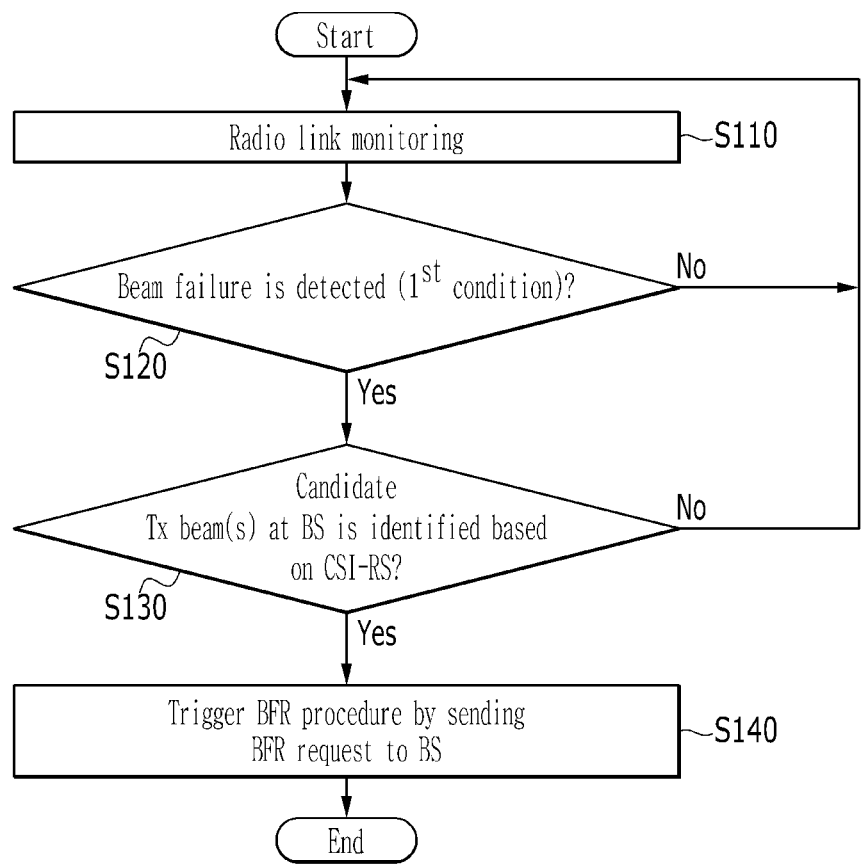
FIG. 1 is a flowchart illustrating a BFR procedure based on a CSI-RS according to an exemplary embodiment.

Hereinafter, exemplary embodiments of the present invention will be described in detail with reference to the accompanying drawings so that those skilled in the art may easily practice the present invention. However, the present invention may be modified in various different ways and is not limited to embodiments described herein. In the accompanying drawings, portions unrelated to the description will be omitted in order to obviously describe the present invention, and similar reference numerals will be used to describe similar portions throughout the present specification. Throughout the specification, a terminal equipment (TE) may be called user equipment (UE), a terminal, a mobile station (MS), a mobile terminal (MT), an advanced mobile station (AMS), a high reliability mobile station (HR-MS), a subscriber station (SS), a portable subscriber station (PSS), an access terminal (AT), a machine-type communication device (MTC device), and the like, and may also include all or some of the functions of the MS, the MT, the AMS, the HR-MS, the SS, the PSS, the AT, the UE, the MTC device, and the like. Further, a gNodeB (gNB) may refer to a base station (BS), an advanced base station (ABS), a high reliability base station (HR-BS), a node B, an evolved node B (eNB), an access point (AP), a radio access station (RAS), a base transceiver station (BTS), a mobile multihop relay (MMR)-BS, a relay station (RS) serving as a base station, a relay node (RN) serving as a base station, an advanced relay station (RS) serving as a base station, a high reliability relay station (HR-RS) serving as a base station, small base stations (a femto base station (femto BS), a home node B (HNB), a home eNodeB (HeNB), a pico base station (pico BS), a macro base station (macro BS), a micro base station (micro BS), and the like), and the like, and may also include all or some of the functions of the ABS, the HR-BS, the node B, the eNodeB, the AP, the RAS, the BTS, the MMR-BS, the RS, the RN, the ARS, the HR-RS, the small base stations, and the like.

The terms used in the present description follow the terms defined in the 3GPP NR and the terms described in the NR-related reports and specifications published by the 3GPP. Single beam operation may be regarded as a special case of the multibeam operation, and the present disclosure may also be applied to the single beam system. The present disclosure is described with an emphasis on the multibeam operation, taking the 3GPP NR system as an example.

In the PRACH of the 3GPP NR, unlike the conventional PRACH use cases including a handover of UE in a radio resource control (RRC) CONNECTED mode and an initial access (IA) or a paging of UE in a RRC IDLE mode, a new use case for a transmission of a beam failure recovery (BFR) request is adopted in an NR-PRACH. The new channel for the transmission of the BFR request is a contention-based channel based on conventional PRACH, in which resources of the new channel are orthogonal to other PRACH transmission resources. The BFR request may be transmitted by the UE in the RRC CONNECTED mode when a beam failure is detected.

Figure 2:
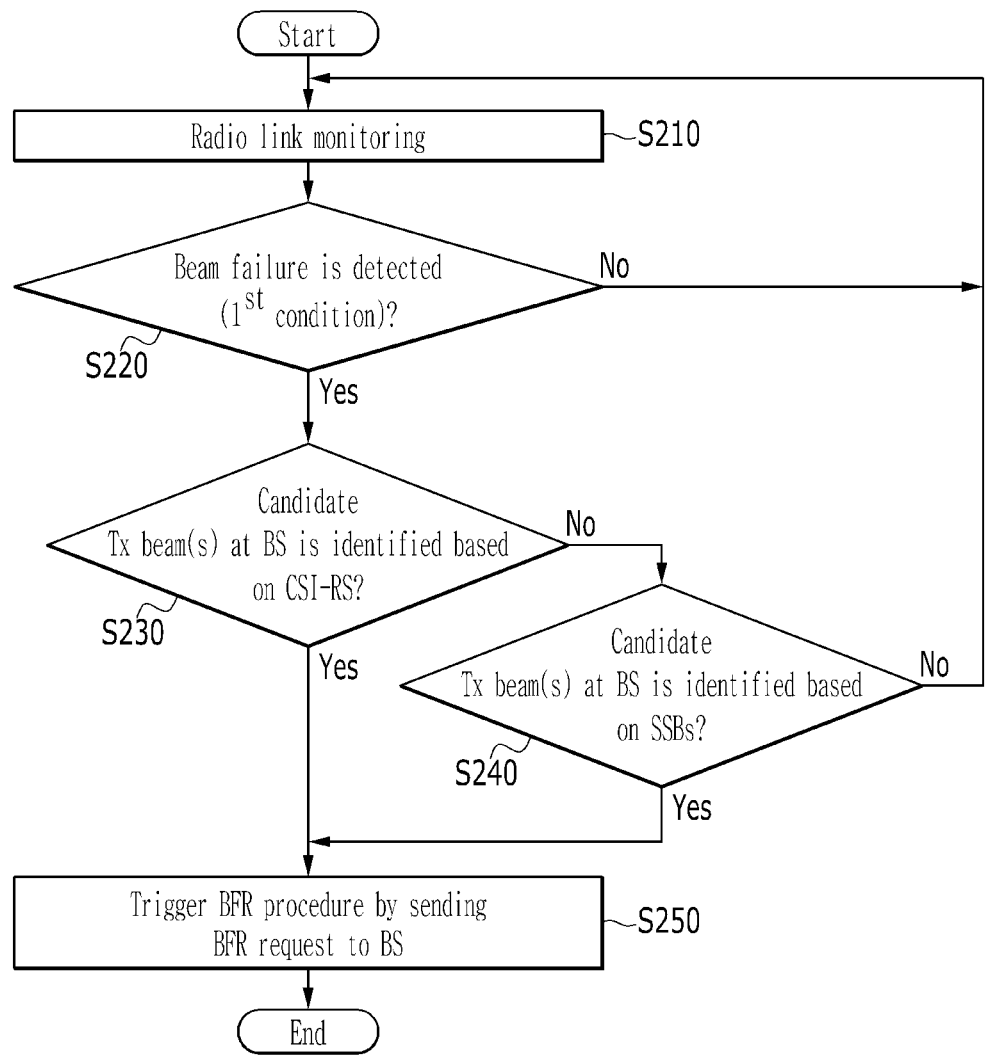
FIG. 2 is a flowchart illustrating a BFR procedure based on the CSI-RS and an SSB according to another exemplary embodiment.

FIG. 1 is a flowchart illustrating a BFR procedure based on a CSI-RS according to an exemplary embodiment, and FIG. 2 is a flowchart illustrating a BFR procedure based on the CSI-RS and an SSB according to another exemplary embodiment.

The BFR procedure according to exemplary embodiments of the present disclosure may include beam failure detection and BFR trigger conditions. Further, the BFR procedure shown in the exemplary embodiments may include candidate transmission beam identification at the base station, BFR request transmission/retransmission, and a BFR request response monitored by the UE.

Hereinafter, the beam failure detection and the BFR trigger conditions is described with reference to FIGS. 1 and 2.

Referring to FIG. 1, in order to detect the beam failure, the UE monitors a radio link to determine whether the BFR trigger condition is met (S110). The UE may use a reference signal (RS) to monitor the radio link. The RS for the beam failure detection may be all RSs or some RSs in a synchronization signal block (SSB) including a synchronization signal (SS) and a demodulation reference signal (DMRS) of a physical broadcast channel (PBCH). In addition, the RS for the beam failure detection may be a channel state information-RS (CSI-RS) configured in the UE for the beam management purpose. The RS for the beam failure detection in the present disclosure may be an RS in the SSB, the CSI-RS, or the RS and the CSI-RS in the SSB. The following describes two conditions for triggering the BFR procedure.

Condition 1: The UE determines whether strength of received power of the reference signal measured by the UE is lower than a predetermined threshold for predetermined time duration (S120).

Condition 1 is equivalent to the case of some performance metric related to the computed error rate of several specific channels. For example, based on the received power of the PBCH-DMRS, an error rate of the PBCH may be estimated. When the UE determines that the estimated error rate is not acceptable, the UE may determine that Condition 1 is met. Similar estimates or calculations for the equivalent performance metrics of other physical channels may be applied to Condition 1. In the present disclosure, the received power of the RS is used as an example for explanation.

Condition 2: The UE determines whether the candidate transmission beam at the base station is identified (S130).

Condition 1 is for the UE to detect the beam failure, and Condition 2 is an additional requirement for Condition 1 to trigger the BFR procedure by the UE. That is, the beam failure is detected when Condition 1 is met, but the UE may transmit the BFR request to the base station to trigger the BFR procedure only when Condition 1 and Condition 2 are simultaneously met (S140). Therefore, even though a beam failure is detected, unless the candidate transmission beam is not identified by the UE, the BFR procedure is not triggered. In this case, out of synchronization (OOS) will be detected by the UE, and the UE then may continue to monitor the radio link quality and trigger a radio link failure (RLF) when the RLF trigger condition is met. Once the two conditions for triggering the BFR procedure are met, though the timer N310 or T310 is in progress, the UE may perform the BFR procedure to recover the radio link. This operation may cause the UE to stop the timer associated with the RLF and reduce UE interruption time due to the radio link problem.

The UE may identify whether the candidate transmission beam exists at the base station in the following manner. In the multibeam system such as the NR, the SSB is transmitted in all transmission beam directions at the base station, and the CSI-RS may be transmitted within a subset of the transmission beams as the UE-specific RS. Thus, in the present disclosure, the UE-specific CSI-RS configured by the network may be used as a primary RS for candidate transmission beam identification and the RS in the SSB may be used as a secondary (supplemental) RS for candidate transmission beam identification.

Referring to FIG. 2, when the UE monitors the radio link (S210) and the beam failure is detected (that is, Condition 1 is met) (S220), the UE may identify the candidate transmission beam at the base station by measuring reference signal received power (RSRP) of the CSI-RS (candidate beam identification) (S230). For example, the UE may complete the candidate beam identification when the RSRP of the CSI-RS is greater than a predetermined threshold. When the candidate transmission beam is detected based on the CSI-RS by the UE, the UE transmits the BFR request to trigger the BFR procedure, to the base station (S250). However, the UE may not be able to identify the candidate transmission beam based on the CSI-RS. For example, the configured subset of the transmission beams with the CSI-RS may be blocked. In this case, the UE may have two options.

Option 1: The UE may continue to monitor the radio link quality without triggering the BFR procedure since Condition 1 for the BFR trigger is not met.

Option 2: Since the SSB is transmitted in all transmission beam directions, the UE may attempt to detect the candidate transmission beam based on RSRP measurements of the RS in the SSB instead of the CSI-RS.

The UE behavior in case of Option 1 may trigger the RLF, and the UE behavior in case of Option 2 may trigger the BFR procedure. The reason is that even though all beam directions in the subset of the transmission beams with a configured CSI-RS are blocked, some other beam directions may still be valid for the UE. When the UE is not able to identify the candidate transmission beam based on the CSI-RS, the UE may attempt to detect the candidate transmission beam based on the SSB (S240). Thus, according to FIG. 2, the probability that the RLF is triggered may be reduced relative to FIG. 1.

According to an exemplary embodiment, the BFR request may be retransmitted after being transmitted. The BFR request may include information for UE identification (e.g., UE ID) and information associated with the candidate transmission beam at the base station. The BFR request may be sent on a channel similar to a physical random access channel (PRACH), and the preamble format of the conventional PRACH may be reused as a format of the BFR request. To simplify the description, the channel for the transmission of the BFR request is called a new PRACH. The conventional preamble format and preamble sequence may be reused for the BFR request. To carry UE ID information, an index of the sequence for generating the BFR request may be used (i.e., the index of the sequence used to generate the BFR request corresponds to the UE ID). That is, the base station may identify the UE based on the index of the sequence used when the BFR request is generated. There are two options for the information about the candidate transmission beam.

Option 1: The UE may report whether the candidate transmission beam exists through the BFR request.

Option 2: The UE may report one or more candidate transmission beams to the base station through the BFR request.

In Option 1, 1-bit information for indicating whether the candidate transmission beam exists may be carried by partitioning of the new PRACH including frequency/time/sequence resources. For example, a different group of sequences for the BFR request or different frequency/time resources of the new PRACH may be used as information indicating whether the candidate transmission beam exists. In Option 2, an association between the SSB and the new PRACH resource may be used to carry the candidate transmission beam information. For example, one or more SSBs may be associated with a subset of the new PRACH resources including frequency/time/sequence resources. Based on the association, the UE may select a new PRACH resource (or a subset of the new PRACH) corresponding to the detected SSB as the candidate transmission beam and transmit the BFR request using the selected new PRACH. As a result, the base station may identify the candidate transmission beam reported by the UE based on the new PRACH resource through which the BFR request of the UE is transmitted. A similar scheme may also be applied when the UE reports the candidate transmission beam information based on an association between the CSI-RS and the new PRACH resource. In this case, the SSB may be quasi co-located with the CSI-RS. To reduce the interrupt time due to the beam failure, before receiving a response for the BFR request from the base station, the UE may transmit a plurality of BFR requests on different UE transmission beams. For the BFR request retransmission, the network may configure a maximum number of retransmissions allowed for a specific UE.

Meanwhile, the BFR response for the BFR request monitored by the UE is as follows.

1. When the UE reports to the base station that the candidate transmission beam at the base station exists, the base station may transmit the BFR response to the UE through all beam directions (all beam directions configured to the UE) or through transmission beam sweeping (Tx beam sweeping) so as to ensure that the UE receives the BFR response.

2. When the UE reports the exact candidate transmission beam to the base station, the base station may transmit the BFR response to the UE through the exact candidate transmission beam which is reported by the UE. For example, the UE may report one best candidate transmission beam within the BFR request to the base station, and the base station may transmit the BFR response through the transmission beam reported by the UE.

3. When the UE reports a plurality of candidate transmission beams to the base station, the base station may transmit the BFR response to the UE through the beam sweeping of the reported plurality of candidate transmission beams. Alternatively, the base station may use the best transmission beam among the plurality of candidate transmission beams reported by the UE to send the BFR response to the UE. In order for the base station to select the best beam, beam quality information of the plurality of candidate transmission beams may be additionally required.

Figure 3:
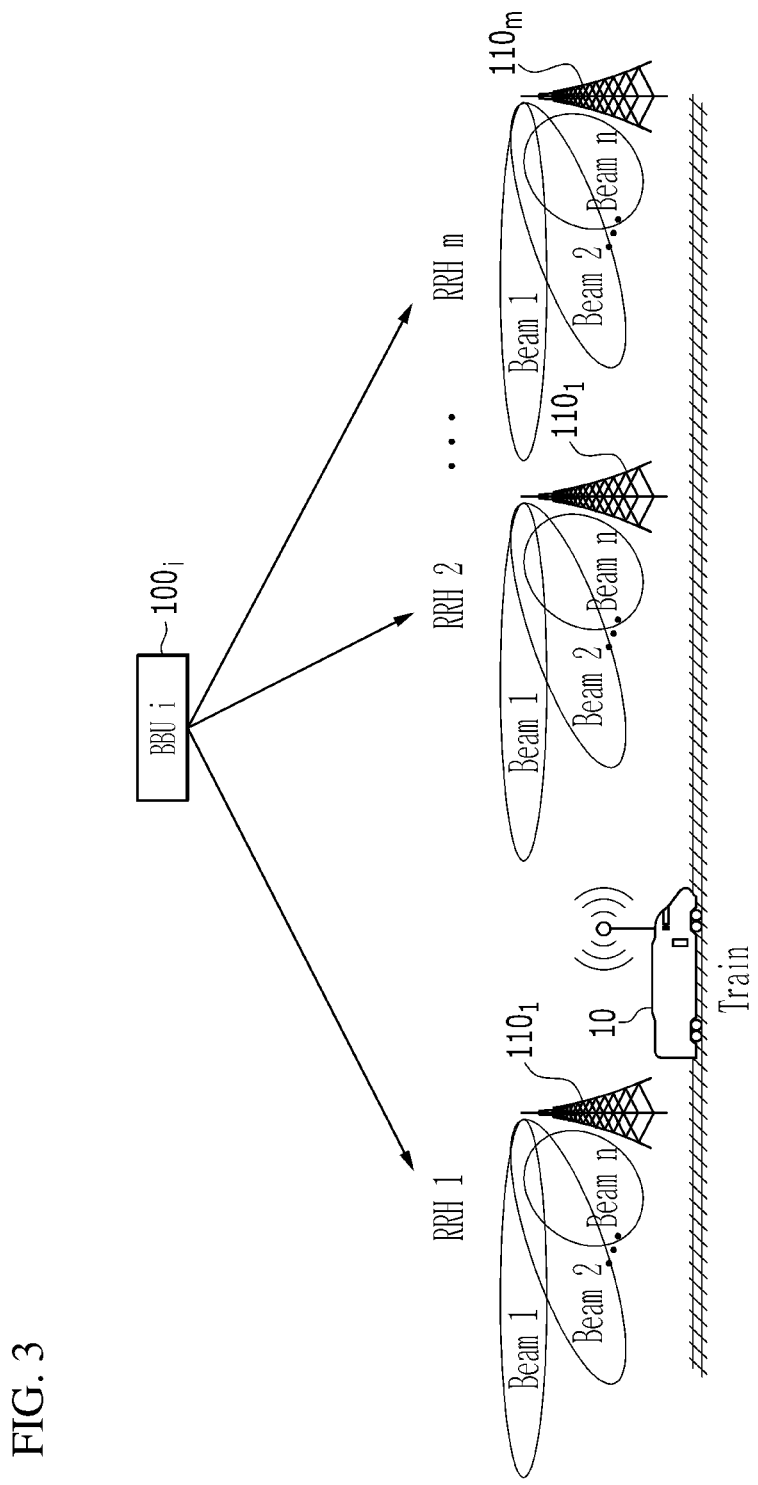
FIG. 3 is a schematic diagram illustrating a multibeam operation of an HST system according to an exemplary embodiment.

FIG. 3 is a schematic diagram illustrating a multibeam operation of an HST system according to an exemplary embodiment.

Referring to FIG. 3, a plurality of remote radio heads (RRH) $110_1$ to $110_m$ are arranged along a railway, and m RRHs $110_1$ to $110_m$ are connected to an i-th Baseband Unit (BBU) $100_i$. In FIG. 3, a train 10 moves from left to right along the railway, and may perform communication with each RRH using a plurality of beams The train 10 includes an onboard terminal equipment (TE) operating as a mobile relay. The onboard TE may carry data between the onboard TE and a terrestrial base station (BS), and may be treated as a single UE. The terrestrial BS may include the BBU and the plurality of RRHs connected to the BBU. Directional antennas may be used in the TE and the RRH. In each RRH, n beams may be generated using beam-forming performed by a directional antenna like a panel antenna.

In the present disclosure, a beam width may be widened as the beam index increases. For example, the beam width of a Beam 1 is narrower than the beam width of a Beam 2, and the beam width of a Beam n is the widest. To reduce the need for frequent beam switching, beams having different beam widths may be allocated to different beam indexes. It is also a reasonable allocation to consider that the path loss is reduced when the train 10 is moving towards to the serving RRH. In this case, the wider beam width may be more important than the higher beam forming gain.

In FIG. 3, when the TE attempts initial access to access the network, the TE may receive a synchronization signal block (SSB) transmitted on a Tx beam of different RRHs. In this case, for the Tx beam of each RRH, one or more SSBs may be transmitted. In FIG. 3, since all RRHs are connected to the same BBU, the SSBs within the same SSB period may be allocated to different transmission beams of the plurality of RRHs. The TE of the train 10 may assume that all RRHs are in a spatial quasi co-located (QCL'ed) and all Tx beam from different RRHs are transmitted from the same location.

When the train 10 moves from coverage of an RRH to coverage of another RRH connected to the same BBU, the BFR procedure may be triggered to maintain the radio link instead of the conventional handover procedure. Furthermore, due to a distance between the RRHs, the TE of the train 10 may detect a timing difference between an expected SSB timing and a detected SSB timing. The timing difference may be used to estimate a timing advance (TA) when the train 10 moves to coverage of the new RRH.

Figure 4:
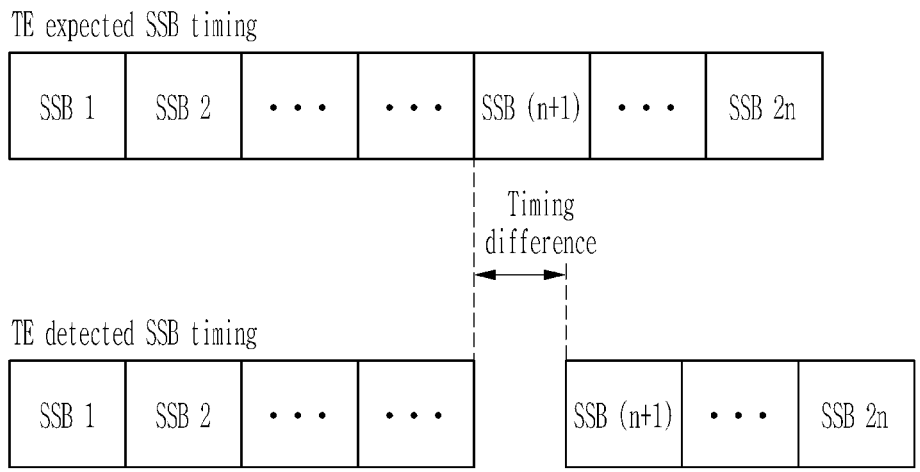
FIG. 4 is a schematic diagram illustrating a timing difference between the expected SSB timing and the detected SSB timing in the TE viewpoint according to an exemplary embodiment.
Figure 5:
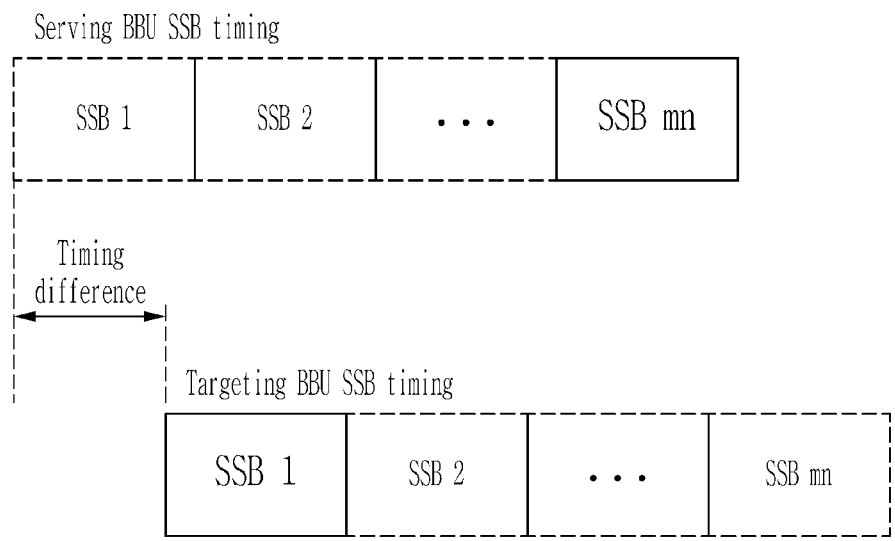
FIG. 5 is a schematic diagram illustrating the SSB timing of the serving BBU and the SSB timing of the target BBU according to an exemplary embodiment.

FIG. 4 is a schematic diagram illustrating a timing difference between the expected SSB timing and the detected SSB timing in the TE viewpoint according to an exemplary embodiment, and FIG. 5 is a schematic diagram illustrating the SSB timing of the serving BBU and the SSB timing of the target BBU according to an exemplary embodiment.

Referring to FIG. 4, the train 10 moves from RRH 1 to RRH m connected to the same BBU. A single SSB is transmitted to the TE of the train 10 on the transmission beam of each RRH. The train 10 is served by the transmission beam of the RRH 1 and then is served by the transmission beam of the RRH 2, so that a timing difference may occur between the SSB n and the SSB (n+1). However, since the TE expects to receive the SSB consecutively from each RRH, there may be a timing difference between the expected SSB timing and the detected SSB timing.

When the train 10 moves from the coverage of one BBU to the coverage of the next BBU, the BFR procedure may not be performed and the handover procedure may be performed. As shown in FIG. 3, when the TE is receiving a service by the transmission beam n of the RRH m, the TE may perform handover to the next BBU. At this time, even though the BBU i may transmit SSBs on all of the Tx beams of the RRH m, the TE may only detect the n-th SSB transmitted by Beam n of the RRH m. If the BBU (i+1) is synchronized with the BBU i, the TE may detect the SSB 1 from the BBU (i+1) at the timing shown in FIG. 5. In this case, the SSB 1 timing of the BBU (i+1) is not overlapped with the SSB timing of the serving BBU i. That is, the TE may detect the SSB of the serving cell and the SSB of the target cell without interference. Therefore, the handover procedure of the 3GPP LTE system may be applied to when the train 10 of FIG. 3 performs the handover from BBU i to BBU (i+1).

Figure 6:
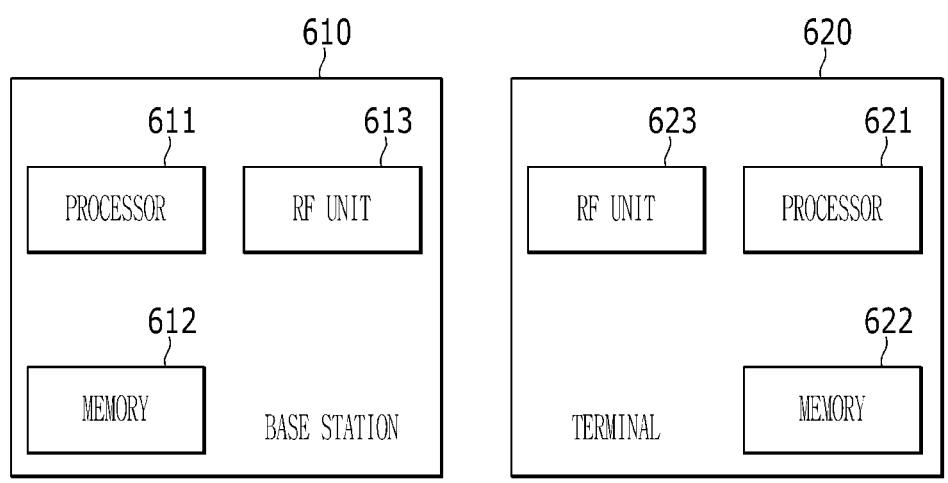
FIG. 6 is a block diagram illustrating a wireless communication system according to an exemplary embodiment.

FIG. 6 is a block diagram illustrating a wireless communication system according to an exemplary embodiment.

Referring to FIG. 6, a wireless communication system according to an exemplary embodiment includes a base station (BS) 610 and user equipment (UE) 620. The BS 610 includes a processor 611, a memory 612, and a radio frequency unit (RF unit) 613. The memory 612 may be connected to the processor 611 to store various pieces of information for driving the processor 611 or at least one program executed by the processor 611. The radio frequency unit 613 may be connected to the processor 611 to transmit/receive a wireless signal. The processor 611 may implement functions, processes, or methods proposed by the exemplary embodiment. In this case, in the wireless communication system according to the exemplary embodiment, a wireless interface protocol layer may be implemented by the processor 611. An operation of the BS 610 according to the exemplary embodiment may be implemented by the processor 611.

The UE 620 includes a processor 621, a memory 622, and a radio frequency unit (RF unit) 623. The memory 622 may be connected to the processor 621 to store various pieces of information for driving the processor 621 or at least one program executed by the processor 621. The radio frequency unit 623 may be connected to the processor 621 to transmit/receive a wireless signal. The processor 621 may implement functions, processes, or methods proposed by the exemplary embodiment. In this case, in the wireless communication system according to the exemplary embodiment, a wireless interface protocol layer may be implemented by the processor 621. An operation of the UE 620 according to the exemplary embodiment may be implemented by the processor 621.

According to the exemplary embodiment of the present disclosure, the memory may be positioned inside or outside the processor and the memory may be connected to the processor through already known various means. The memory may be various types of volatile or non-volatile storage media. For example, the memory may include a read-only memory (ROM) or a random access memory (RAM).

While this disclosure has been described in connection with what is presently considered to be practical example embodiments, it is to be understood that the disclosure is not limited to the disclosed embodiments, but, on the contrary, is intended to cover various modifications and equivalent arrangements included within the spirit and scope of the appended claims.

The invention claimed is:

1. An operation method of a terminal in a communication system, comprising:
   receiving information on a maximum number of retransmissions of a random access (RA) preamble for triggering a beam failure recovery from a base station;
   detecting beam failure with the base station;
   performing a measurement operation of one or more channel state information reference signals (CSI-RSs) received from the base station to search a candidate beam of the base station when the beam failure is detected;
   selecting the candidate beam based on a result of the measurement operation of the one or more CSI-RSs;
   identifying a first synchronization signal block (SSB) which is quasi co-located with a first CSI-RS received in the selected candidate beam among the one or more CSI-RSs;
   identifying the RA preamble associated with the identified first SSB as a RA preamble to be used when a RA preamble associated with the first CSI-RS is not indicated from the base station;
   performing a transmission operation of the RA preamble associated with the identified first SSB for triggering the beam failure recovery to the base station; and
   performing a retransmission operation of the RA preamble by the maximum number of retransmissions when the transmission operation of the RA preamble is failed,
   wherein, when the retransmission operation of the RA preamble is failed by the maximum number of retransmissions, the retransmission operation of the RA preamble for triggering the beam failure recovery is stopped.

2. The operation method of claim 1, wherein the RA preamble is transmitted in a physical random access channel (PRACH) resource which is a time-frequency resource.

3. The operation method of claim 1, wherein the RA preamble is transmitted using a PRACH resource which is a preamble sequence.

4. The operation method of claim 1, wherein the RA preamble is transmitted using resources associated with the first SSB which is quasi co-located with the first CSI-RS.

5. The operation method of claim 1, wherein the RA preamble is transmitted using resources associated with the first CSI-RS.

6. The operation method of claim 1, wherein the RA preamble is transmitted from the terminal, which operates in radio resource control (RRC)_CONNECTED.

7. The operation method of claim 1, wherein the RA preamble is transmitted using orthogonal resources based on a contention-free RA procedure.

8. A terminal in a communication system, comprising:
   a processor; and
   memory storing one or more commands executed by the processor,
   wherein the one or more commands are executed to receive information on a maximum number of retransmissions of a random access (RA) preamble for triggering a beam failure recovery from a base station, detect beam failure with the base station, perform a measurement operation of one or more channel state information-reference signals (CSI-RSs) received from the base station to search a candidate beam of the base station when the beam failure is detected, select the candidate beam based on a result of the measurement operation of the one or more CSI-RSs, identify a first synchronization signal block (SSB) which is quasi co-located with a first CSI-RS received in the selected candidate beam among the one or more CSI-RSs, identify the RA resource associated with the identified first SSB as a RA preamble to be used when a RA resource associated with the first CSI-RS is not indicated from the base station, perform a transmission operation of the RA preamble for triggering the beam failure recovery using the RA resource associated with the identified first SSB to the base station, and perform a retransmission operation of the RA preamble by the maximum number of retransmissions when the transmission operation of the RA preamble is failed,
   wherein, when the retransmission operation of the RA preamble is failed by the maximum number of retransmissions, the retransmission operation of the RA preamble for triggering the beam failure recovery is stopped.

9. The terminal of claim 8, wherein the RA resource is a time-frequency resource.

10. The terminal of claim 8, wherein the RA resource is a preamble sequence.

11. The terminal of claim 8, wherein the RA preamble is associated with the first SSB which is quasi co-located with the first CSI-RS.

12. The terminal of claim 8, wherein the RA preamble is associated with the first CSI-RS.

13. The terminal of claim 8, wherein the RA preamble is transmitted from the terminal, which operates in radio resource control (RRC)_CONNECTED.

14. The terminal of claim 8, wherein the RA preamble is transmitted using orthogonal resources based on a contention-free RA procedure.

* * * * *